No. 776,716.

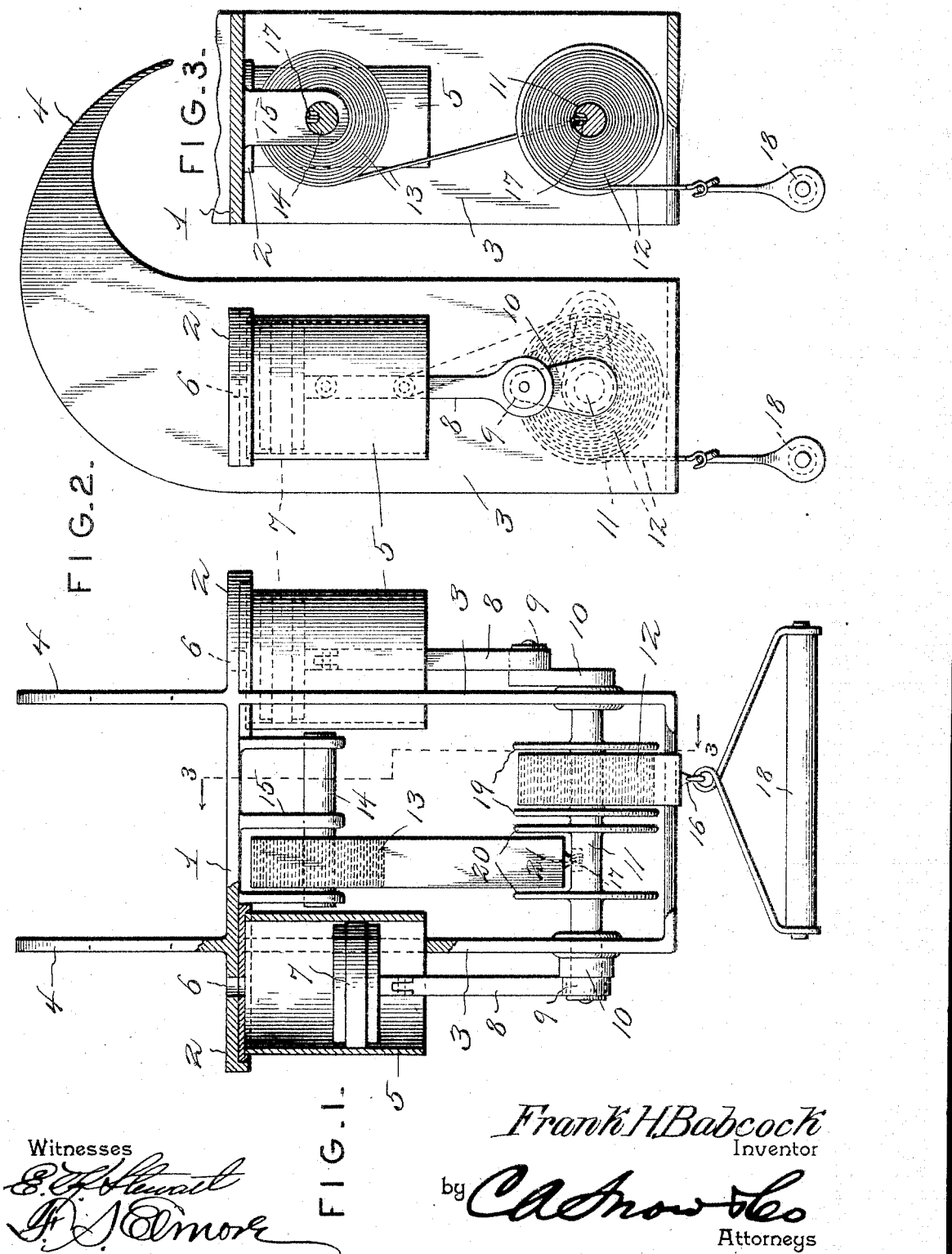

Patented December 6, 1904.

UNITED STATES PATENT OFFICE.

FRANK H. BABCOCK, OF BUTLER, PENNSYLVANIA.

FIRE-ESCAPE.

SPECIFICATION forming part of Letters Patent No. 776,716, dated December 6, 1904.

Application filed May 10, 1904. Serial No. 207,262. (No model.)

*To all whom it may concern:*

Be it known that I, FRANK H. BABCOCK, a citizen of the United States, residing at Butler, in the county of Butler and State of Pennsylvania, have invented a new and useful Fire-Escape, of which the following is a specification.

My invention relates to portable fire-escapes, and has for its objects to produce a comparatively simple inexpensive device of this character adapted in practice to be readily transported from place to place and having a pair of life-lines designed to wind alternately onto the winding shaft or drum, whereby the device may be continuously operated and one in which the unwinding of the life-line from the drum will be positively controlled to regulate the speed of descent of the operator.

To these ends the invention comprises the novel features of construction and combination of parts more fully hereinafter described.

In the accompanying drawings, Figure 1 is a front elevation, partly in section, of my improved device. Fig. 2 is a side elevation of the same. Fig. 3 is a sectional view taken on the line 3 3 of Fig. 1.

Referring to the drawings, 1 designates the main frame, composed, preferably, of metal and of substantially rectangular form, as herein shown, said frame having a pair of lateral extensions 2, carried, respectively, by its side bars 3, and a pair of spaced upwardly and rearwardly projecting engaging hooks 4.

Carried by the frame 1 and seated in suitable openings provided in the sides 3 of the latter is a pair of compression-cylinders 5, disposed normally vertical and having their upper ends arranged, respectively, beneath the extensions 2 and provided with openings or ports 6, leading outward through the latter to admit of entrance and escape of air to and from the cylinders. Arranged for longitudinal reciprocation within the cylinders 5 are suitable pistons 7, carried by the upper ends of piston-rods 8, the lower ends of which are pivoted, respectively, upon wrist-pins 9, fixed at the outer ends of crank-arms 10, in turn fixed, respectively, upon the opposite ends of a horizontal winding shaft or drum 11, journaled for rotation in suitable bearings adjacent to the lower end of the frame 1, attention being directed to the fact that the crank-arms are arranged at substantially right angles to each other, whereby during the operation of the device the pistons will stroke alternately in their respective cylinders.

The device is equipped with a pair of life-lines 12 13, preferably in the form of flat steel tapes, as shown, and initially wound, respectively, upon the shaft 11 and an idler-shaft 14, journaled for rotation in suitable bearings depending from the top horizontal bar of the frame 1 immediately over the shaft 11, there being three of the bearing-hangers 15, which divide the shaft 14 into a pair of line-receiving portions and which further serve as guides for the lines while being wound and unwound to and from the shaft. The primary line 12 is provided with terminal hooks 16, one of which engages an eye 17 on the shaft 11 for detachably connecting the line with the latter and the other of which has detachably engaged therewith a suitable handpiece 18, adapted to be grasped by the operator, the line being disposed between a pair of guide members or disks 19, provided for the purpose upon the shaft 11, a similar pair of members or disks 20 being also provided on the shaft to receive between them the secondary line 13, which, as in the instance of the primary line, is provided with terminal engaging devices or hooks 21, adapted for detachably connecting the line with either of the shafts 11 or 14 or with a second handpiece similar to the handpiece 18 and with which the apparatus will in practice be equipped.

In practice, supposing the life-lines to be wound, respectively, upon the shafts 11 14, as illustrated in Figs. 1 and 3, the line 12 will in unwinding, under the influence of the weight of the operator, serve to wind the line 13 from the shaft 14 onto the shaft 11, and the line 13 in unwinding from the latter shaft will again wind thereon the line 12. Thus as one line unwinds from a second line will be wound upon the shaft 11, thereby insuring a continuous and unlimited operation of the device in practice. Upon a discontinuation of the operation one of the lines will of course be in wound condition upon the shaft 11, while the other will be unwound, it being apparent that the latter line may be detached from the shaft 11 and attached to and wound upon the idler-shaft 14 on the appropriate portion of the latter. As the shaft 11 rotates to permit unwinding of either of the life-lines therefrom it will, through the medium of the cranks 10 and rods 8, reciprocate the pistons 7 within the cylinders 5, this action serving on the down or in stroke of the pistons to draw air into the cylinders through the ports 6 and upon the upward or out stroke of the pistons to compress the air, which as the outstroke continues gradually escapes through the port 6. It is apparent from this arrangement that the speed of rotation of the shaft will be positively controlled, thereby controlling the rate of descent of the operator, and that the speed of descent may be regulated by regulating or varying the sizes of the ports 6.

From the foregoing it is apparent I produce a simple device admirably adapted for the attainment of the ends in view, it being understood, however, that minor changes in the details of construction herein set forth may be resorted to without departing from the spirit of the invention.

Having thus described the invention, what is claimed is—

1. In a device of the class described, a frame including a pair of spaced side bars and an upper connecting-bar, bearing hangers depending from the upper bar, an idler-shaft journaled in the hangers and separated thereby into a pair of distinct line-receiving portions, a main shaft journaled in the frame and having a pair of line-receiving drums arranged respectively in alinement with said line-receiving portions, a pair of life-lines adapted to wind alternately to and from the main shaft respectively upon the drums, the idler-shaft being designed to normally receive one of the lines within the appropriate line-receiving portion, a pair of cylinders carried by the frame, and pistons arranged within the cylinders and operatively connected with the main shaft.

2. In a device of the class described, the combination with a frame, of a main shaft journaled therein, a pair of cylinders carried by the frame, pistons working in said cylinders and connected to the shaft, a pair of life-lines adapted to wind alternately to and from the shaft, and a second idle shaft disposed parallel with the main shaft and provided with a winding-surface coextensive with the whole of the winding-surface of the main shaft.

3. In a fire-escape, a frame including main plates, the upper portions of which are curved to form suspension-hooks, cylinders carried by the frame, a main shaft journaled in said frame, cranks on the end of the shaft, pistons disposed in the cylinders and connected to said cranks, a pair of life-lines adapted to wind alternately to and from the shaft, a second shaft arranged parallel with the first, hangers carried by the frame, and forming a support for the shaft, the hangers dividing said second shaft into two distinct line-receiving portions on which either of the life-lines may be temporarily wound.

In testimony that I claim the foregoing as my own I have hereto affixed my signature in the presence of two witnesses.

FRANK H. BABCOCK.

Witnesses:
  H. H. REED,
  L. P. WALKER.